United States Patent
Hunt

(10) Patent No.: US 8,803,097 B2
(45) Date of Patent: Aug. 12, 2014

(54) RADIATION DETECTOR DEVICE HAVING A PLURALITY OF BOOT SECTIONS

(75) Inventor: Jeffrey D. Hunt, Concord, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 687 days.

(21) Appl. No.: 12/696,542

(22) Filed: Jan. 29, 2010

(65) Prior Publication Data
US 2010/0193690 A1 Aug. 5, 2010

Related U.S. Application Data

(60) Provisional application No. 61/148,580, filed on Jan. 30, 2009.

(51) Int. Cl.
| | | |
|---|---|---|
| G01V 5/00 | (2006.01) | |
| G01T 1/20 | (2006.01) | |
| G01T 1/202 | (2006.01) | |
| G01V 5/04 | (2006.01) | |

(52) U.S. Cl.
CPC ............... *G01T 1/2002* (2013.01); *G01T 1/202* (2013.01); *G01V 5/04* (2013.01)

USPC ............ 250/361 R; 250/269.1; 250/256; 250/253; 250/483.1

(58) Field of Classification Search
CPC ............ G01V 5/04; G01V 5/06; G01V 1/40; G01T 1/2002; G01T 1/20; G01T 1/202; G01T 1/00
USPC ........ 250/256, 269.1, 253, 361 R, 254, 483.1
See application file for complete search history.

(56) References Cited

U.S. PATENT DOCUMENTS

| | | | |
|---|---|---|---|
| 5,869,836 A | 2/1999 | Linden et al. | |
| 6,359,282 B1 * | 3/2002 | Sekela | 250/370.11 |
| 2006/0027753 A1 * | 2/2006 | Medley et al. | 250/361 R |
| 2009/0261257 A1 * | 10/2009 | Menge | 250/367 |

* cited by examiner

*Primary Examiner* — David Porta
*Assistant Examiner* — Yara B Green
(74) *Attorney, Agent, or Firm* — Abel Law Group, LLP; Robert N. Young

(57) ABSTRACT

A scintillation device includes a scintillator body and a plurality of boot sections spaced apart from each other by at least one gap. Each of the plurality of boot sections substantially surrounds a portion of the scintillator body and wherein the plurality of boot sections are characterized by a total length that is less than a length of the scintillator body.

20 Claims, 3 Drawing Sheets

RADIATION DETECTOR DEVICE HAVING A PLURALITY OF BOOT SECTIONS

RELATED APPLICATION

This is related to and claims priority under 35 U.S.C. §119(e) to U.S. Patent Application No. 61/148,580 entitled "Radiation Detector Having a Plurality of Boot Sections" by Jeffrey D. Hunt on Jan. 30, 2009, which is assigned to the current assignee hereof and incorporated herein by reference in its entirety.

FIELD OF THE DISCLOSURE

The present disclosure is directed to radiation detector devices, particularly ruggedized scintillation devices for industrial applications.

BACKGROUND

Radiation detector devices are used in a variety of industrial applications. For example, scintillation detectors are used for well logging in the oil and gas industry. Typically, scintillation detectors have scintillator bodies made of an activated sodium iodide (NaI(Tl)) or other materials (e.g., CsI(Tl), CsI(Na), $Lu_{2-x}Y_xSiO_5(Ce)$, $LaBr_3(Ce)$, $LaCl_3(Ce)$, BGO, $CeBr_3$, $LuI_3(Ce)$, $LuAlO_3(Ce)$, $Lu_{1-x}Y_xAlO_3(Ce)$, $Lu_2Si_2O_7(Ce)$, $LuAl_2O_5(Ce)$) that are effective for detecting gamma rays. Generally, the scintillator bodies are enclosed in casings or sleeves that include a window to permit radiation-induced scintillation light to pass out of the crystal package. The light passes to a light-sensing device such as a photomultiplier tube, and the photomultiplier tube converts the light photons emitted from the crystal into electrical pulses. The electrical pulses are shaped and digitized by associated electronics and may be registered as counts that are transmitted to analyzing equipment.

Scintillation detectors are useful for well logging, because the measurement of radiation, such as gamma rays and neutrons, allows users to analyze rock strata that surround a bore hole. Scintillation detectors can be used in drilling apparatuses themselves, giving rise to the common practice of measurement while drilling (MWD). Nonetheless, MWD applications often take place in severe environments characterized by large amounts of heat, vibration and shock, which impact detector durability and accuracy.

Accordingly, the industry continues to need improvements in radiation detector devices, particularly durable, ruggedized scintillation detectors that can withstand the harsh environments of industrial applications.

SUMMARY

According to a first aspect, a scintillation device includes a scintillator body and a plurality of boot sections spaced apart from each other by at least one gap. Each of the plurality of boot sections substantially surrounds a portion of the scintillator body. The plurality of boot sections are characterized by a total length that is less than a length of the scintillator body. In one example of the second aspect, the plurality of boot sections includes at least two boot sections separated by a gap. In another example of the second aspect, the plurality of boot sections includes at least three boot sections separated by two gaps. The plurality of boot sections can be approximately equal in length.

In an embodiment of the first aspect, the plurality of boot sections cover less than or equal to approximately ninety percent (90%) of a surface area of the scintillator body. In another embodiment of the first aspect, the plurality of boot sections cover less than or equal to approximately eighty percent (80%) of a surface area of the scintillator body. In a further embodiment of the first aspect, the plurality of boot sections cover less than or equal to approximately seventy percent (70%) of a surface area of the scintillator body. In an additional embodiment of the first aspect, the plurality of boot sections cover less than or equal to approximately sixty percent (60%) of a surface area of the scintillator body.

In still another embodiment of the first aspect, the plurality of boot sections include a polymer. For example, the plurality of boot sections can include silicone rubber.

According to a second aspect, a radiation detector device includes a photosensor and a scintillator coupled to the photosensor. The scintillation device includes a scintillator body having a proximal end proximal to the photosensor and a distal end distal from the photosensor. The scintillation device also includes a first boot section and a second boot section spaced apart from each other by a gap. Each boot section substantially surrounds a portion of the scintillator body.

In one embodiment of the second aspect, the scintillator body is substantially cylindrical, and each of the first boot section and second boot section can form a closed loop. In another embodiment of the second aspect, the scintillation device includes a plurality of boot sections that includes at least the first boot section and the second boot section. The plurality of boot sections are characterized by a total length that is less than the length of the scintillator body.

In a further embodiment of the second aspect, the first boot section is adapted to apply a first compressive force to the scintillator body and the second boot section is adapted to apply a second compressive force to the scintillator body, where the first compressive force is lower than the second compressive force. The first boot section can be nearer to the proximal end of the scintillator body than the second boot section. In an additional embodiment of the second aspect, the first boot section and the second boot section apply a total compressive force to the scintillator body of from approximately 500 psi to approximately 5000 psi.

In yet another embodiment of the second aspect, the first boot section and the second boot section have a total length that is less than or equal to approximately ninety percent (90%) of a length of the scintillator body. For example, the first boot section and the second boot section can have a total length that is less than or equal to approximately eighty percent (80%) of a length of the scintillator body.

In still another embodiment of the second aspect, the first boot section and the second boot section comprise a bakeless material. In an additional embodiment of the second aspect, the plurality of boot sections do not make contact with each other upon thermal expansion of a material used to form the boot sections at a temperature that is less than or equal to approximately 250° C.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed devices, systems or methods. Moreover, some statements may apply to some inventive features but not to others.

Figure 1:
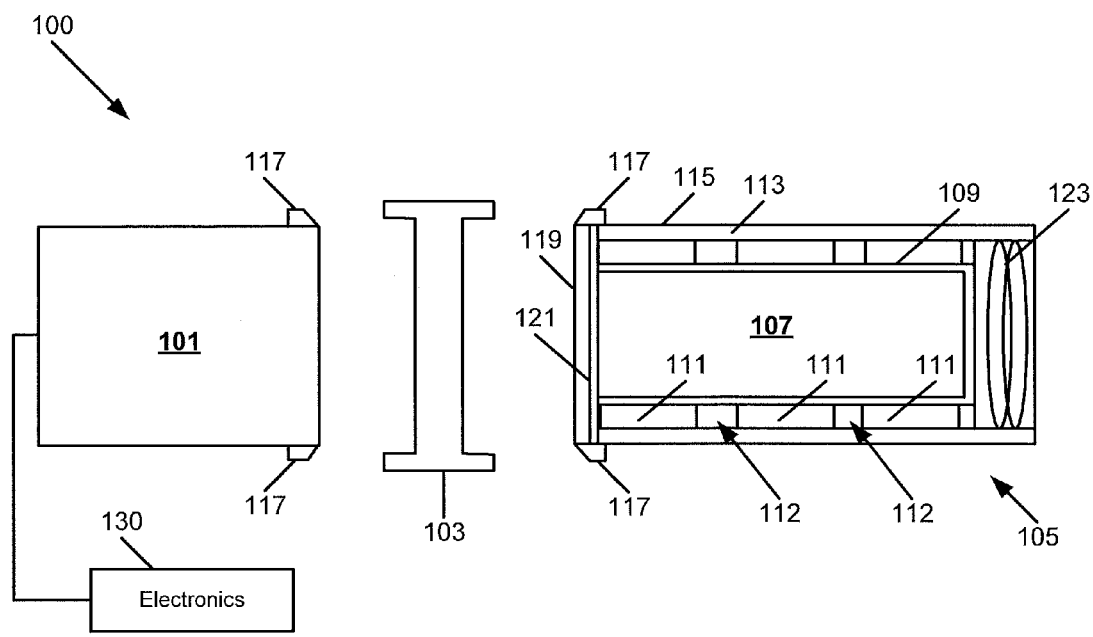
FIG. 1 is an illustration of a particular embodiment of a radiation detector device including a cross-sectional view of a scintillation device.

FIG. 1 shows a particular embodiment of a radiation detector device 100, including a cross-sectional view of a scintillation device 105. The radiation detector device 100 also includes a photosensor 101 and a light pipe 103. Though the photosensor 101, the light pipe 103, and the scintillation device 105 are illustrated separately from each other, it is to be understood that the photosensor 101 and the scintillation device 105 are adapted to be coupled to each other via the light pipe 103. In one embodiment, the scintillation device 105 and the photosensor 101 can be coupled to the light pipe 103 using resilient biasing members 117 that facilitate the absorption of shocks to the detector 100. The biasing members 117 can be used in conjunction with other known coupling methods such as an optical gel, a bonding agent, welding, another method, or any combination thereof.

In one embodiment, the photosensor 101 includes a device capable of spectral detection and resolution. For example, the photosensor 101 can comprise a conventional photomultiplier tube (PMT) or a hybrid photosensor. The photosensor 101 is adapted to receive photons emitted by the scintillation device 105, other sources, or a combination thereof; and the photosensor 101 is adapted to produce electrical pulses from photons that it receives. The electrical pulses can be shaped and digitized by associated electronics 130 to provide a count of the photons received at the photosensor 101. The electronics 130 can include one or more electronic devices, such as an amplifier, a pre-amplifier, a discriminator, an analog-to-digital signal converter, a photon counter, another electronic device, or any combination thereof. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillation device 105 and facilitates optical coupling between the photosensor 101 and the scintillation device 105. In one embodiment, the light pipe 103 can include a quartz light pipe, plastic light pipe, or another light pipe. In another embodiment, the light pipe 103 can comprise a silicone rubber interface that optically couples an output window 119 of the scintillation device 105 with an input window of the photosensor 101. In some embodiments, multiple light pipes can be disposed between the photosensor 101 and the scintillation device 105.

The scintillation device 105 includes a scintillator body 107 housed within a casing 115. According to one embodiment, the scintillator body 107 can be an activated iodide crystal, such as a thallium-activated sodium iodide crystal or other material suitable for measurement-while-drilling (MWD) applications. The scintillator body 107 can have various shapes, such as a rectangular shape, or a cylindrical surface including flat end faces. It will be appreciated that the surface finish of the scintillator body 107 can be sanded, polished, ground, etc., as desired.

The scintillator body 107 has a length that extends from a first end that is proximal to the photosensor 101 and a second end that is distal from the photosensor 101. An output window 119 is interfaced with the first end of the scintillator body 107. The output window 119 can include glass or another transparent or translucent material suitable to allow photons emitted by the scintillator body 107 to pass from the scintillation device 105 toward the photosensor 101. An optical interface 121 is disposed between the scintillator body 107 and the output window 119. The optical interface 121 can comprise clear silicone rubber. In one embodiment, the optical interface 121 is polarized to optically couple the scintillator body 107 to the output window 119 by aligning the reflective indices of the scintillator body 107 and the output window 119.

The scintillation device 105 also includes a reflector 109 substantially surrounding the scintillator body 107. In addition, the scintillation device 105 includes a plurality of boot sections 111 that act as shock absorbers. The plurality of boot sections 111 prevent damage to the crystal from forces caused during drilling or other uses and also help to increase accuracy by reducing spurious counts, such as false photon emissions. Each of the plurality of boot sections 111 substantially surrounds a portion of the scintillator body 107. In one embodiment, the scintillator body 107 can be cylindrical, and each of the boot sections can form a closed loop around a portion of the scintillator body 107. In another embodiment, each of the boot sections 111 can form a non-closed shape around the scintillator body. The plurality of boot sections 111 can include two boot sections, such as a first boot section and a second boot section separated by a gap 112. In another example, the plurality of boot sections 111 can include three boot sections separated by two gaps 112. In a particular embodiment, each gap is sufficiently large that the plurality of boot sections 111 do not make contact with each other upon thermal expansion of a material used to form the boot sections 111 at temperatures encountered during well-logging, such as at a temperature that is less than or equal to approximately 250° C.

The plurality of boot sections 111 are spaced along the scintillator body 107, such that at least some of the boot sections 111 are not in contact with each other. For instance, as illustrated in FIG. 1, the plurality of boot sections 111 can be separated from each other by one or more gaps 112. In one embodiment, the plurality of boot sections 111 can be approximately equal in length. Alternatively, at least some of the plurality of boot sections 111 may not be approximately equal in length.

In addition, the plurality of boot sections 111 are characterized by a total length that is less than the length of the scintillator body 107. In one embodiment, the plurality of boot sections 111 can be characterized by a total length that is less than or equal to approximately ninety percent (90%) of the length of the scintillator body 107. For example, the plurality of boot sections 111 can be characterized by a total length that is less than or equal to approximately eighty percent (80%) of the length of the scintillator body 107, such as less than or equal to approximately seventy percent (70%) or less than or equal to approximately sixty percent (60%) of the length of the scintillator body 107, but at least thirty percent (30%) of the length of the scintillator body, such as fifty percent (50%) of the length of the scintillator body.

Further, the plurality of boot sections 111 cover less than all surface area of the scintillator body 107. For instance, the plurality of boot sections 111 can cover less than or equal to approximately ninety percent (90%) of the surface area of the scintillator body 107. For instance, the plurality of boot sections 111 can cover less than or equal to approximately eighty percent (80%) of the surface area of the scintillator body 107, such as less than or equal to approximately seventy percent (70%) or less than or equal to approximately sixty percent (60%) of the surface area of the scintillator body 107, but at least thirty percent (30%) of the surface area of the scintillator body, such as fifty percent (50%) of the surface area of the scintillator body.

The plurality of boot sections 111 can comprise a bakeless material, that is, a material that can undergo an initial heat treatment, such as curing, but does not require additional heat treatment beyond a curing process to evolve species that may volatilize. According to one embodiment, the boot sections 111 can include a polymer, such as liquid silicone rubber; another material; or a combination thereof. In one embodiment, a boot sleeve 113 can be disposed between the plurality of boot sections 111 and the casing 115. Further, the scintillation device 105 can also include a spring 123, or other stabilization mechanism, interfaced with an end of the scintillator body 107 that is distal from the photosensor 101.

Figure 2:
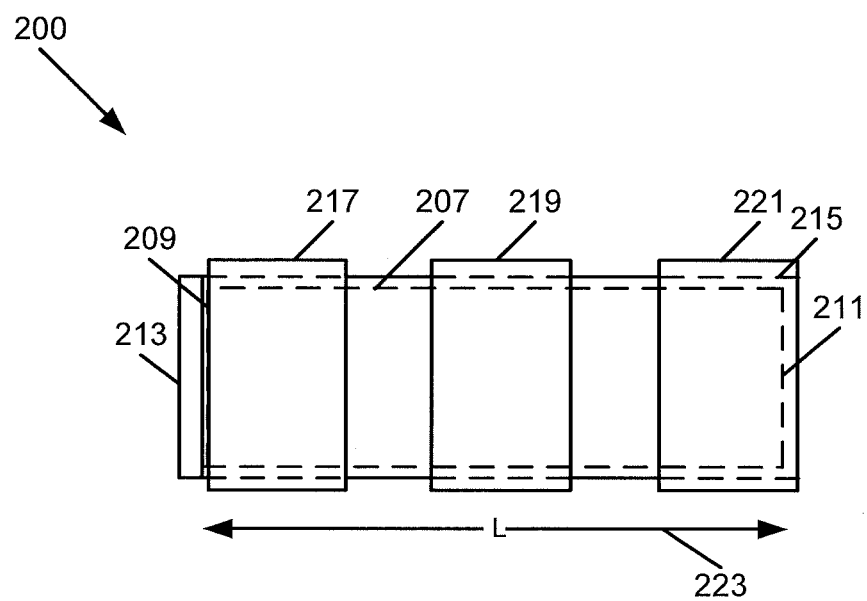
FIGS. 2 and 3 are illustrations of a particular embodiment of a scintillation device.

FIG. 2 is an illustration of a particular embodiment of a scintillation device 200. The scintillation device 200 includes a scintillator body 207 having a length extending from a proximal end 209 to a distal end 211. An output window 213 can be interfaced with the proximal end 209 of the scintillator body 207. The scintillation device 200 includes a plurality of boot sections, 217, 219, 221. In one embodiment, a reflector 215 is disposed between the plurality of boot sections 217, 219, 221, and the scintillator body 207.

Figure 3:
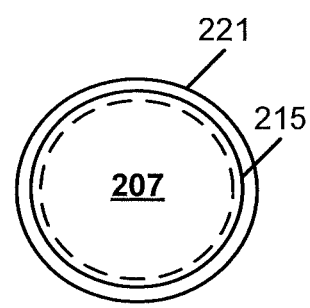

Each of the plurality of boot sections 217, 219, 221 substantially surrounds a portion of the scintillator body 207. For instance, where the scintillator body 207 is substantially cylindrical, as illustrated in FIG. 3, each boot section can substantially surround a circumference of a portion of the scintillator body 207, forming a closed loop. In other embodiments, each boot section can surround less than the whole circumference and form a non-closed shape. The plurality of boot sections 217, 219, 221 are spaced along the scintillator body 207, such that at least some of the boot sections 217, 219, 221 are not in contact with each other. For instance, the plurality of boot sections 217, 219, 221 can be separated by one or more gaps.

The plurality of boot sections 217, 219, 221 are characterized by a total length that is less than a length 223 of the scintillator body 207. Further, the plurality of boot sections 217, 219, 221 cover less than all surface area of the scintillator body 207. In an illustrative, non-limiting example, the plurality of boot sections 217, 219, 221 apply a total compressive force to the scintillator body 207 of from approximately 500 psi to approximately 5000 psi. In other embodiments, the plurality of boot sections 217, 219, 221 can apply other total compressive forces to the scintillator body 207.

The plurality of boot sections 217, 219, 221 can apply approximately equal compressive forces to the scintillator body 207. Alternatively, at least some of the plurality of boot sections 217, 219, 221 can apply compressive forces to the scintillator body 207 which are not approximately equal. For example, the boot section 217 nearest to the proximal end 209 of the scintillator body 207 can apply a substantially lower compressive force to the scintillator body 207 than the boot sections 219 and 221 apply to the scintillator body 207.

The plurality of boot sections 217, 219, 221 are characterized by a total length that is less than the length of the scintillator body 207. In one embodiment, the plurality of boot sections 217, 219, 221 can be characterized by a total length that is less than or equal to approximately ninety percent (90%) of the length of the scintillator body 207. For example, the plurality of boot sections 217, 219, 221 can be characterized by a total length that is less than or equal to approximately eighty percent (80%) of the length of the scintillator body 207, such as less than or equal to approximately seventy percent (70%) or less than or equal to approximately sixty percent (60%) of the length of the scintillator body 207, but at least thirty percent (30%) of the length of the scintillator body 207, such as fifty percent (50%) of the length of the scintillator body 207.

Further, the plurality of boot sections 217, 219, 221 cover less than all surface area of the scintillator body 207. For instance, the plurality of boot sections 217, 219, 221 can cover less than or equal to approximately ninety percent (90%) of the surface area of the scintillator body 207. For instance, the plurality of boot sections 217, 219, 221 can cover less than or equal to approximately eighty percent (80%) of the surface area of the scintillator body 207, such as less than or equal to approximately seventy percent (70%) or less than or equal to approximately sixty percent (60%) of the surface area of the scintillator body 207, but at least thirty percent (30%) of the surface area of the scintillator body 207, such as fifty percent (50%) of the surface area of the scintillator body 207.

Figure 4:
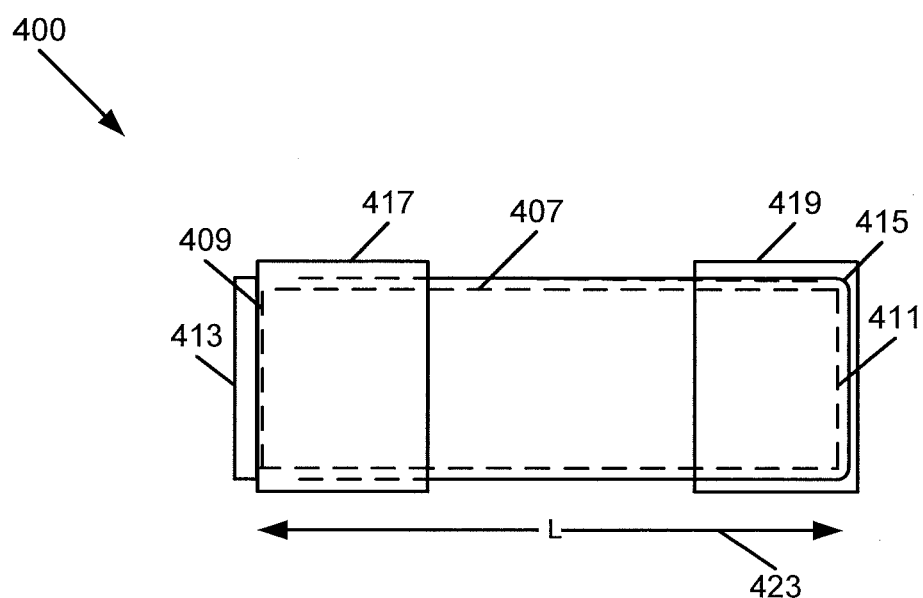
FIG. 4 is an illustration of a second particular embodiment of a scintillation device.

FIG. 4 illustrates a second particular embodiment of a scintillation device 400. The scintillation device 400 includes a scintillator body 407 having a length extending from a proximal end 409 to a distal end 411. An output window 413 can be interfaced with the proximal end 409 of the scintillator body 407. The scintillation device 400 includes a plurality of boot sections, 417 and 419 that are separated by a gap. In a particular embodiment, the gap is sufficiently large that the plurality of boot sections do not make contact with each other upon thermal expansion of a material used to form the boot sections. In one embodiment, a reflector 415 is disposed between the plurality of boot sections 417, 419, and the scintillator body 407.

Each of the plurality of boot sections 417, 419 substantially surrounds a portion of the scintillator body 407. The plurality of boot sections 417, 419 are characterized by a total length that is less than a length 423 of the scintillator body 407. In one embodiment, the plurality of boot sections 417, 419 can apply approximately equal compressive forces to the scintillator body 407. In another embodiment, the boot section 417 nearest to the proximal end 409 of the scintillator body 407 can apply a lower compressive force to the scintillator body 407 than the boot section 419 applies to the scintillator body 407, for example, to prevent the scintillator body 407 from deforming to a wedge shape at the proximal end 409. In the embodiment shown in FIG. 4, the boot sections 417, 419 can also be substantially closed such that they cup the ends 409, 411 of the scintillator body 407. In other embodiments, the boot sections 417, 419 can be open, such that they form sleeves around the scintillator body.

The plurality of boot sections 417, 419 are characterized by a total length that is less than the length of the scintillator body 407. In one embodiment, the plurality of boot sections 417, 419 can be characterized by a total length that is less than or equal to approximately ninety percent (90%) of the length of the scintillator body 407. For example, the plurality of boot sections 417, 419 can be characterized by a total length that is less than or equal to approximately eighty percent (80%) of the length of the scintillator body 407, such as less than or equal to approximately seventy percent (70%) or less than or equal to approximately sixty percent (60%) of the length of the scintillator body 407, but at least thirty percent (30%) of the length of the scintillator body 407, such as fifty percent (50%) of the length of the scintillator body 407.

Further, the plurality of boot sections 417, 419 cover less than all surface area of the scintillator body 407. For instance, the plurality of boot sections 417, 419 can cover less than or equal to approximately ninety percent (90%) of the surface area of the scintillator body 407. For instance, the plurality of boot sections 417, 419 can cover less than or equal to approximately eighty percent (80%) of the surface area of the scintillator body 407, such as less than or equal to approximately seventy percent (70%) or less than or equal to approximately sixty percent (60%) of the surface area of the scintillator body 407, but at least thirty percent (30%) of the surface area of the scintillator body 407, such as fifty percent (50%) of the surface area of the scintillator body 407.

In conjunction with the configuration and structure disclosed herein, a radiation detector device is provided, which includes a scintillation device having a plurality of boot sections separated by one or more gaps. When the vibration of drilling action, for example, causes the temperature of the scintillation device to increase, the boot material typically expands more than the scintillator body. For example, the expansion coefficient of the boot can be on the order of 250 ppm/C. This expansion in a single boot can compress the scintillator body as the scintillator body goes plastic due to increase in temperature (e.g., at or above approximately 165° C. for NaI scintillator body), and the compression can cause deformation of the scintillator body.

The use of a plurality of boot sections separated by one or more gaps, instead of a single continuous boot, gives the boot sections room to expand and limits deformation exhibited by high mass scintillator bodies (e.g., 20 g to 1000 g) under high loads, by reducing compressive forces resulting from expansion of the boot. Reducing deformation of the scintillator body can decrease the emission of false scintillation photons caused by vibration, by from approximately five percent (5%) to approximately fifteen percent (15%), when compared to scintillation light output using a single, full-length boot. In a particular embodiment, boot sections can be placed at the ends of the scintillator body, such that overall compressive force is reduced while holding the scintillator body in place at the areas most prone to move during vibration.

The illustrations of the embodiments described herein are intended to provide a general understanding of the structure of the various embodiments. The illustrations are not intended to serve as a complete description of all of the elements and features of the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A radiation detector device, comprising:
    a scintillator body;
    a plurality of boot sections spaced apart from each other by at least one gap, wherein:
        each of the plurality of boot sections substantially surrounds a portion of the scintillator body;
        the plurality of boot sections are characterized by a total length that is less than a length of the scintillator body; and
        the plurality of boot sections comprise a polymer that acts as a shock absorber,
    a photosensor optically coupled to the scintillator body; and
    electronics coupled to the photosensor, wherein the electronics include an amplifier, a pre-amplifier, a discriminator, a photon counter, an analog-to-digital convertor, or any combination thereof,
    wherein the radiation detector device is configured to be part of a drilling apparatus.

2. The radiation detector device of claim 1, wherein the plurality of boot sections includes at least two boot sections separated by a gap.

3. The radiation detector device of claim 1, wherein the plurality of boot sections includes at least three boot sections separated by two gaps.

4. The radiation detector device of claim 1, wherein the plurality of boot sections cover less than or equal to approximately ninety percent (90%) of a surface area of the scintillator body.

5. The radiation detector device of claim 1, wherein the plurality of boot sections cover less than or equal to approximately seventy percent (70%) of a surface area of the scintillator body.

6. The radiation detector device of claim 1, wherein the plurality of boot sections cover less than or equal to approximately sixty percent (60%) of a surface area of the scintillator body.

7. The radiation detector device of claim 1, wherein the plurality of boot sections comprise silicone rubber.

8. The radiation detector device of claim 1, wherein the plurality of boot sections are approximately equal in length.

9. The radiation detector device of claim 1, wherein the electronics comprises the analog-to-digital converter.

10. A radiation detector device, comprising:
    a photosensor;
    electronics coupled to the photosensor, wherein the electronics include an amplifier, a pre-amplifier, a discriminator, a photon counter, an analog-to-digital convertor, or any combination thereof; and
    a scintillation device coupled to the photosensor, the scintillation device including: a scintillator body having a proximal end proximal to the photosensor and a distal end distal from the photosensor; and a first boot section and a second boot section spaced apart from each other by a gap, wherein: each boot section substantially surrounds a portion of the scintillator body; and the first boot section and the second boot section comprise a bakeless material wherein the first and second boot sections are configured to act as shock absorbers, wherein the radiation device is configured to be part of a drilling apparatus.

11. The radiation detector device of claim 10, wherein the scintillator body is substantially cylindrical and wherein each of the first boot section and second boot section forms a closed loop.

12. The radiation detector device of claim 10, wherein the scintillation device comprises a plurality of boot sections that includes at least the first boot section and the second boot section and wherein the plurality of boot sections are characterized by a total length that is less than a length of the scintillator body.

13. The radiation detector device of claim 10, wherein the first boot section and the second boot section apply a total compressive force to the scintillator body of from approximately 500 psi to approximately 5000 psi.

14. The radiation detector device of claim 10, wherein the first boot section and the second boot section have a total length that is less than or equal to approximately ninety percent (90%) of a length of the scintillator body.

15. The radiation detector device of claim 10, wherein the plurality of boot sections do not make contact with each other upon thermal expansion of a material used to form the boot sections at a temperature that is less than or equal to approximately 250° C.

16. The radiation detector device of claim 10, wherein the first boot section and the second boot section have a total length that is less than or equal to approximately eighty percent (80%) of a length of the scintillator body.

17. The radiation detector device of claim 10, wherein the first boot section and the second boot section further comprise silicon rubber.

18. The radiation detector device of claim 10, wherein the electronics comprise the analog-to-digital converter.

19. A radiation detector device comprising:
a photosensor; and
a scintillation device coupled to the photosensor, the scintillation device including:
a scintillator body having a proximal end proximal to the photosensor and a distal end distal from the photosensor; and
a first boot section and a second boot section spaced apart from each other by a gap, wherein:
each boot section substantially surrounds a portion of the scintillator body;
the first boot section is adapted to apply a first compressive force to the scintillator body and the second boot section is adapted to apply a second compressive force to the scintillator body; and
the first compressive force is lower than the second compressive force.

20. The radiation detector device of claim 19, wherein first boot section is nearer to the proximal end of the scintillator body than the second boot section.

* * * * *